(12) United States Patent
Lee et al.

(10) Patent No.: US 9,747,868 B2
(45) Date of Patent: *Aug. 29, 2017

(54) FOLDABLE DISPLAY DEVICE AND METHOD OF CONTROLLING THEREFOR

(71) Applicant: LG Electronics Inc., Seoul (KR)

(72) Inventors: Doyoung Lee, Seoul (KR); Youngsin Kim, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

This patent is subject to a terminal disclaimer.

(21) Appl. No.: 14/860,327

(22) Filed: Sep. 21, 2015

(65) Prior Publication Data
US 2016/0012797 A1 Jan. 14, 2016

Related U.S. Application Data

(63) Continuation of application No. 13/967,022, filed on Aug. 14, 2013, now Pat. No. 9,183,770.

(30) Foreign Application Priority Data

Jun. 19, 2013 (KR) .......................... 10-2013-0070144

(51) Int. Cl.
| | |
|---|---|
| *H05B 37/02* | (2006.01) |
| *H05B 39/04* | (2006.01) |
| *H05B 41/36* | (2006.01) |
| *G09G 5/10* | (2006.01) |
| *G09G 3/00* | (2006.01) |

(Continued)

(52) U.S. Cl.
CPC ............ *G09G 5/10* (2013.01); *G06F 1/1616* (2013.01); *G06F 1/1637* (2013.01); *G06F 1/1641* (2013.01); *G06F 1/1677* (2013.01); *G06F 1/3265* (2013.01); *G06F 3/1423* (2013.01); *G09G 3/00* (2013.01); *G09G 3/20* (2013.01); *H04M 1/0243* (2013.01); *H04M 1/22* (2013.01); *G09G 2320/0626* (2013.01); *G09G 2356/00* (2013.01); *G09G 2360/144* (2013.01); *H04M 1/0214* (2013.01); *H04M 2250/16* (2013.01); *Y02B 60/1242* (2013.01)

(58) Field of Classification Search
CPC ............ G09G 2300/026; G06F 3/1446; G06F 3/1431; G02F 1/13336; H04N 9/12
USPC .................................. 345/1.3, 690; 315/153
See application file for complete search history.

(56) References Cited

U.S. PATENT DOCUMENTS 8,384,615 B2 * 2/2013 Tan ...................... H04M 1/0214
345/1.1
2006/0125784 A1 * 6/2006 Jang ...................... G06F 1/1616
345/156

(Continued)

FOREIGN PATENT DOCUMENTS

| JP | 11-337921 | 12/1999 |
|---|---|---|
| JP | 2010-122414 | 6/2010 |

(Continued)

*Primary Examiner* — Quan Tra
(74) *Attorney, Agent, or Firm* — Birch, Stewart, Kolasch & Birch, LLP

(57) ABSTRACT

A foldable display device and a method of controlling therefor, and more particularly, to a method of configuring illuminance of a display screen according to an illuminance value detected based on a folding angle between a first body and a second body of the foldable display device.

17 Claims, 11 Drawing Sheets

(51) Int. Cl.
*G09G 3/20* (2006.01)
*G06F 1/16* (2006.01)
*G06F 3/14* (2006.01)
*G06F 1/32* (2006.01)
*H04M 1/22* (2006.01)
*H04M 1/02* (2006.01)

(56) References Cited

U.S. PATENT DOCUMENTS

| | | | |
|---|---|---|---|
| 2009/0303216 A1* | 12/2009 | Shin | G09G 3/3406 345/207 |
| 2010/0194725 A1* | 8/2010 | Yoshida | G09G 3/3406 345/207 |
| 2011/0074655 A1 | 3/2011 | Tan et al. | |
| 2011/0248967 A1 | 10/2011 | Wang et al. | |
| 2011/0249042 A1 | 10/2011 | Yamamoto et al. | |
| 2012/0001949 A1 | 1/2012 | Seki et al. | |

FOREIGN PATENT DOCUMENTS

| | | |
|---|---|---|
| JP | 2010-124067 | 6/2010 |
| JP | 2011-223251 | 11/2011 |
| JP | 2013-7827 | 1/2013 |

* cited by examiner

FIG. 2
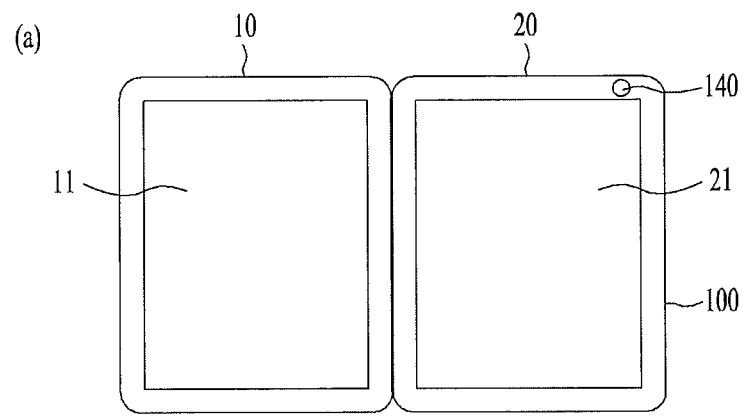
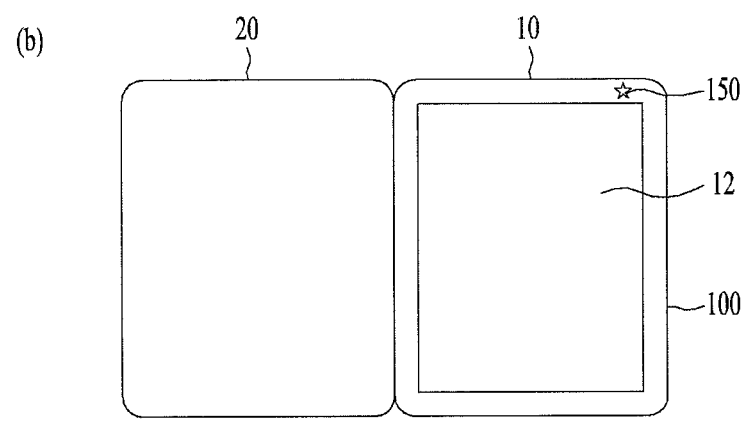
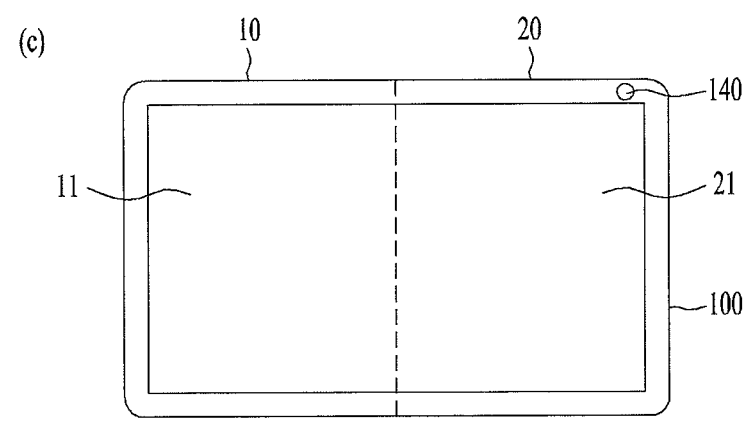

FIG. 3
(a) 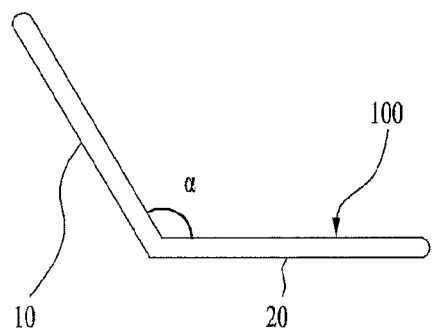
(b) 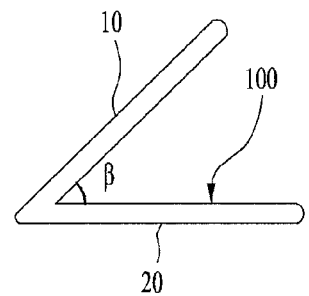
FIG. 4
(a) 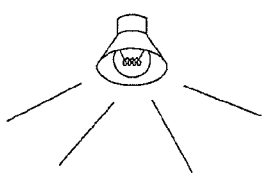
(b) 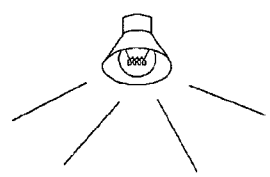
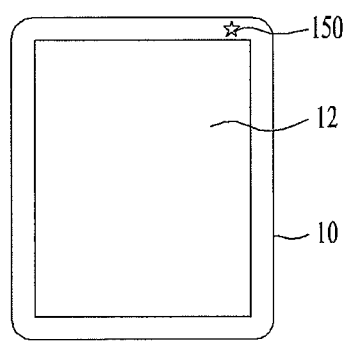
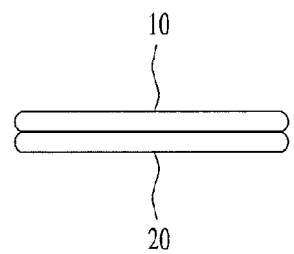

FIG. 5
(a) 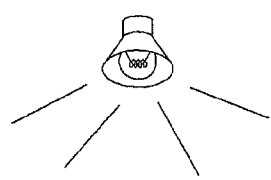
(b) 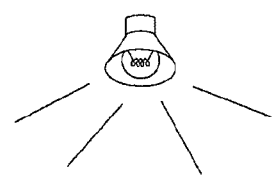
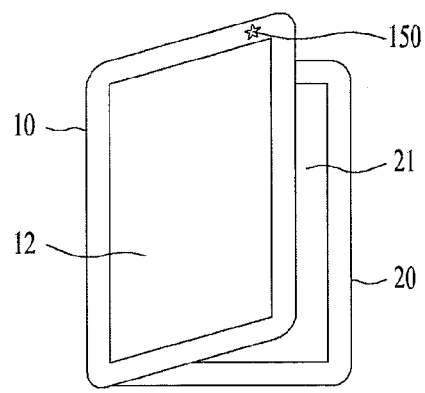
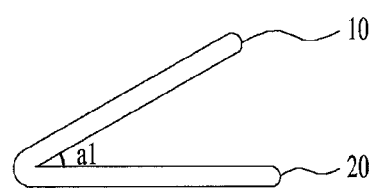

FIG. 6
(a) 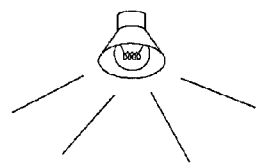 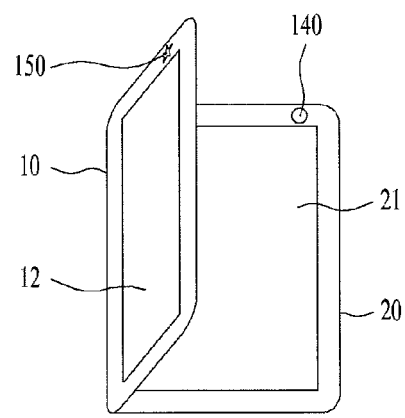
(b) 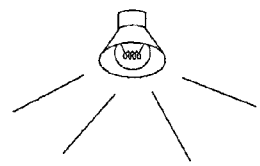 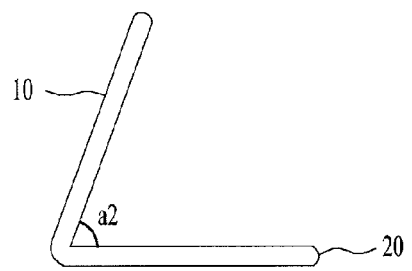

FIG. 7
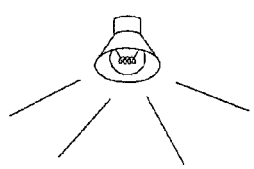
(a)
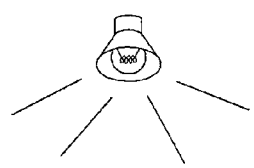
(b)
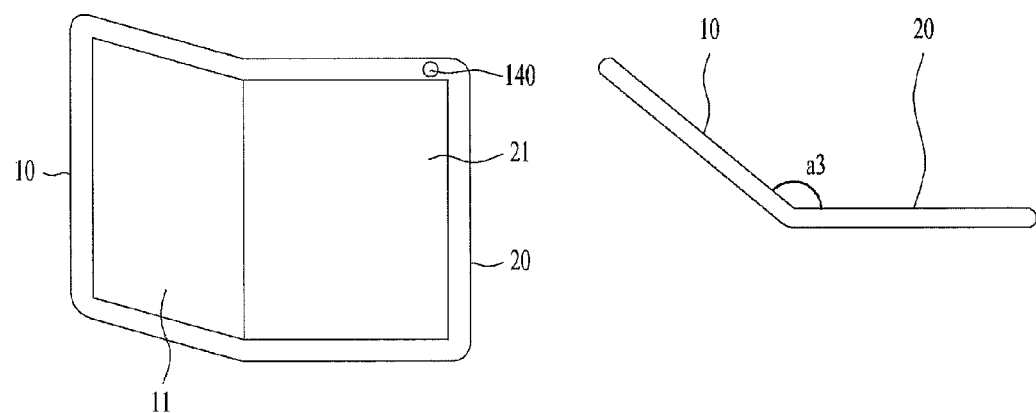

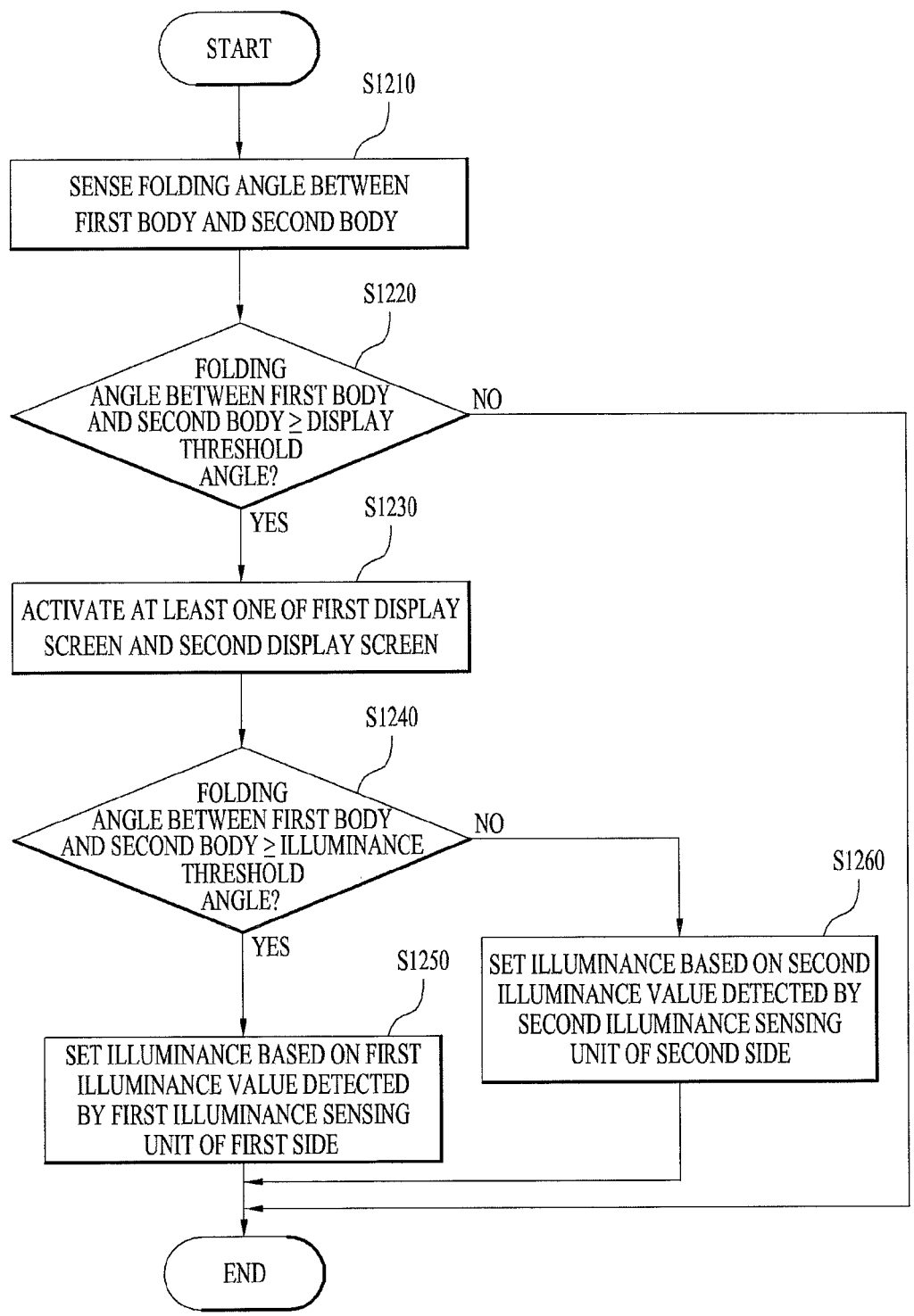

FOLDABLE DISPLAY DEVICE AND METHOD OF CONTROLLING THEREFOR

CROSS REFERENCE TO RELATED APPLICATIONS

This application is a Continuation of co-pending U.S. application Ser. No. 13/967,022, filed on Aug. 14, 2013, which claims the benefit of the Korean Patent Application No. 10-2013-0070144, filed on Jun. 19, 2013, which is hereby incorporated by reference as if fully set forth herein.

BACKGROUND OF THE INVENTION

Field of the Invention

The present specification relates to a foldable display device and a method of controlling therefor, and more particularly, to a method of configuring illuminance of a display screen according to an illuminance value detected based on a folding angle between a first body and a second body of the foldable display device.

Discussion of the Related Art

Recently, as technologies have been developed, such a digital device as a smart phone enabled a user to perform a function that the user wants using various sensors provided in the device. For instance, the digital device can control brightness of a screen by detecting a neighboring light with an illuminance sensor installed in the digital device.

Meanwhile, the digital device can control brightness of a screen using the illuminance sensor in case that the digital device includes a foldable display screen as well. In particular, the digital device including a foldable display screen can control illuminance of a screen using an illuminance value detected by an illuminance sensor. In this case, the illuminance value detected at a same place can vary according to a folding angle of the digital device. Hence, it is necessary to have an efficient method of configuring illuminance of the foldable display screen according to various folding angles.

SUMMARY OF THE INVENTION

Accordingly, the present specification is directed to an apparatus and method thereof that substantially obviate one or more problems due to limitations and disadvantages of the related art.

According to one embodiment, one object of the present specification is to provide a foldable display device capable of easily controlling illuminance of a display screen provided in the foldable display device based on a folding angle of the foldable display device and a method of controlling therefor.

Another object of the present specification is to provide a foldable display device determining an illuminance sensing unit capable of precisely reflecting illuminance of an external environment among a plurality of illuminance sensing units in a state that the foldable display device is unfolded or folded and the foldable display device controlling illuminance of a display screen based on a illuminance value detected by the determined illuminance sensing unit.

Another object of the present specification is to provide a foldable display device capable of easily controlling illuminance of an internal and external display screen based on a folding angle in case that the foldable display device is equipped with the external display screen as well as the internal display screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, according to one embodiment a foldable display device includes a first body configured to support a first display screen, a second body configured to support a second display screen wherein the first display screen and the second display screen are provided at a first side of the foldable display device, an angle sensing unit configured to sense a folding angle between the first body and the second body, wherein the first body and the second body are foldable in a direction to which the first display screen and the second display screen are facing, a first illuminance sensing unit provided in the second side configured to sense illuminance, a second illuminance sensing unit provided in the second side, which is an opposite side of the first side, configured to sense illuminance, and a processor configured to control the first body, the second body, the angle sensing unit, the first illuminance sensing unit, and the second illuminance sensing unit, wherein the processor is further configured to: set illuminance of at least one of the first display screen and the second display screen provided at the first side, based on a first illuminance value detected by the first illuminance sensing unit of the first side, when the folding angle between the first body and the second body is equal to an illuminance threshold angle or greater than the illuminance threshold angle, set the illuminance of at least one of the first display screen and the second display screen provided at the first side, based on a second illuminance value detected by the second illuminance sensing unit of the second side, when the folding angle between the first body and the second body is smaller than the illuminance threshold angle.

To further achieve these and other advantages and in accordance with the purpose of the present specification, according to one embodiment a method of controlling a foldable display device includes the steps of: sensing a folding angle between a first body providing/supporting a first display screen and a second body providing/supporting a second display screen, wherein the folding angle is an angle formed by the first body and the second body, when the first display screen and the second display screen are foldable in a direction to which the first display screen and the second display screen are facing, illuminance of at least one of the first display screen of a first side and the second display screen, based on a first illuminance value detected by a first illuminance sensing unit of the first side, when the folding angle between the first body and the second body is equal to an illuminance threshold angle or greater than the illuminance threshold angle, wherein the first display screen and the second display screen are provided at the first side, and setting the illuminance of at least one of the first display screen and the second display screen, which are provided at the first side, based on a second illuminance value detected by a second illuminance sensing unit of a second side, which is an opposite side of the first side, when the folding angle between the first body and the second body is smaller than the illuminance threshold angle.

In one embodiment, in case that a folding angle between bodies is changeable, a foldable display device can control illuminance of a display screen using an illuminance sensing unit provided at an internal/external of the device to make a user easily use the device.

In another embodiment, in case that a folding angle between bodies is changeable, a user can easily use a device in a manner of activating a display screen provided at a first side or a second side of a foldable display device based on the folding angle.

In another embodiment, in case that all display screens installed in an internal and external of a foldable display device are activated, a user can conveniently use the device in a manner of differently controlling illuminance of the display screens installed in the internal and external of the foldable display device depending on a folded or unfolded condition of the foldable display device.

In another embodiment, a foldable display device can reduce power consumption of the device in a manner of activating a display screen provided at a first side or a second side of the foldable display device based on a folding angle.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram indicating one embodiment of a foldable display device of the present specification;

FIG. 3 is a diagram indicating one embodiment for an illuminance threshold angle and a display threshold angle of a foldable display device of the present specification;

FIG. 4 is a diagram indicating a first embodiment of an illuminance setting according to a folding angle of a foldable display device of the present specification;

FIG. 5 is a diagram indicating a second embodiment of an illuminance setting according to a folding angle of a foldable display device of the present specification;

FIG. 6 is a diagram indicating a third embodiment of an illuminance setting according to a folding angle of a foldable display device of the present specification;

FIG. 7 is a diagram indicating a fourth embodiment of an illuminance setting according to a folding angle of a foldable display device of the present specification;

FIG. 12 is a flowchart of a method of controlling a foldable display device of the present display device.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
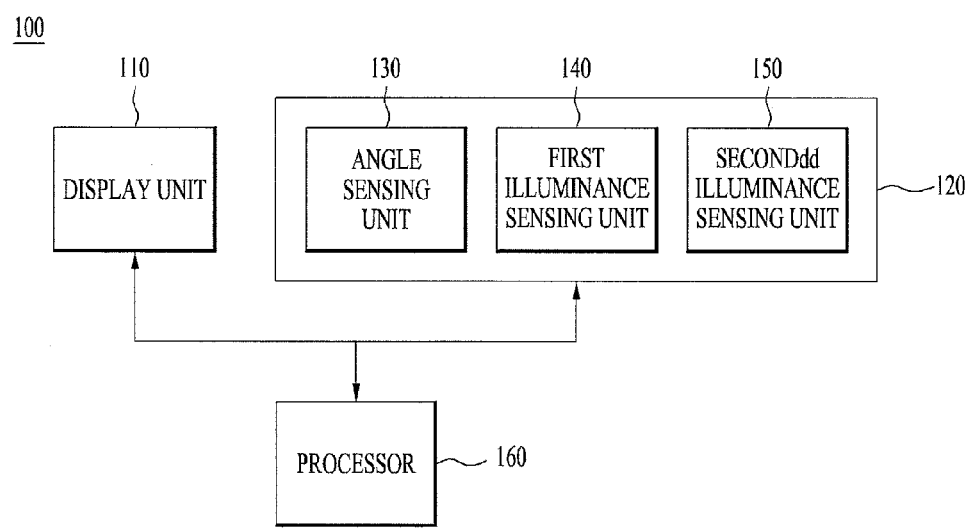
FIG. 1 is a block diagram of a foldable display device of the present specification.

FIG. 1 is a block diagram of a foldable display device of the present specification. As depicted in FIG. 1, a foldable display device 100 can include a display unit 110, a sensing unit 120, and a processor 160.

First of all, the foldable display device 100 is a digital device capable of displaying an image and can include various digital devices equipped with a foldable body. For instance, the foldable display device 100 can include a laptop, a tablet PC, a smartphone, and the like.

The display unit 110 can output an image in a display screen based on content or application executed by the processor 160 or a control command of the processor 160.

In the present specification, the display unit 110 can include a first display screen and a second display screen. And, the first display screen can be supported by a first body and the second display screen can be supported by a second body. In this case, the first and the second body can be included in the display unit. And, the first and the second display screen can be provided at a first side of the foldable display device 100.

In one embodiment, the foldable display device 100 can include one display unit. In this case, the first display screen and the second display screen can be provided in the one display unit. In another embodiment, the foldable display device 100 can include a plurality of display units. In this case, the first display screen and the second display screen can be provided in the first display unit and the second display unit, respectively. Regarding this, it shall be explained in detail with reference to FIG. 2.

And, the display unit 110 can include a foldable display screen. Hence, the foldable display device 100 can fold the first body and the second body in a manner that the first display screen and the second display screen are facing with each other.

And, the display unit 110 can include a third display screen. The third display screen can be positioned at an opposite side of the first display screen. And, the third display screen can be positioned at a second side, which is an opposite side of a first side. Regarding this, it shall be explained in detail with reference to FIG. 2.

The sensing unit 120 is configured to sense a neighbor environment of the foldable display device 100 using at least one sensor installed in the foldable display device 100 and can transmit the neighbor environment to the processor 160 in a form of a signal. And, the sensor unit 120 is configured to sense a user input and can transmit a signal resulted from a sensed result to the processor 160.

And, the sensing unit 120 can include at least one sensing means. In one embodiment, the at least one sensing means can include such a sensing means as a gravity sensor, a geomagnetic sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensing unit 120 is a common name of the aforementioned various sensing means and can transmit sensed results to the processor to enable the processor 160 to perform an operation according to the sensed results by sensing various inputs of a user and an environment of the foldable display device 100. The aforementioned sensors may be included in the foldable display device 100 as a separate element or may be included in the foldable display device by being combined in the at least one element.

In the present specification, the sensing unit 120 can include an angle sensing unit 130, a first illuminance sensing unit 140, and a second illuminance sensing unit 150. The angle sensing unit 130 is configured to sense a folding angle between the first body and the second body using at least one sensor installed in the foldable display device 100 and can transmit the folding angle to the processor in a form of a signal. In this case, the folding angle indicates an angle formed by the first body and the second body when the first display screen and the second display screen can be folded by facing with each other.

And, the first illuminance sensing unit 140 provided in the first side at which the first and the second display screen are positioned can sense a first illuminance value. In this case, the first illuminance value indicates the density of a light detected by the first illuminance sensing unit 140. And, the second illuminance sensing unit 150 provided in the second side, which is an opposite side of the first side, can sense a second illuminance value. In this case, the second illuminance value indicates the density of a light detected by the second illuminance sensing unit 150.

The processor 160 can execute the content received by a data communication, the content stored in a storage unit (not depicted), or the like. And, the processor 160 is configured to control each of the units of the foldable display device 160 and can control data transmission and reception between the units.

In the present specification, the processor 160 is configured to recognize a signal delivered from at least one of the display unit 10 and the sensing unit 20 and can control the foldable display device 100 according to the signal.

More specifically, the processor 160 can detect a signal delivered from at least one of the display unit 10 and the sensing unit 20 among a plurality of signals transmitted from a configuration unit. In particular, the processor 160 detects an input signal received from a specific sensor among a plurality of the received signals and can perform an operation corresponding to the input signal. In the following description, if each step or operation performed by the foldable display device 100 is started or progressed by an external input signal, assume that a process of generating the external input signal includes explanation on the aforementioned process, even though it is not duplicately explained.

In one embodiment, the processor 160 can set at least one illuminance of the first display screen and the second display screen based on a first illuminance value detected by the first illuminance sensing unit 140, when a folding angle between the first body 10 and the second body 20 is equal or greater than the illuminance threshold angle. In another embodiment, the processor 160 can set at least one illuminance of the first display screen and the second display screen based on a second illuminance value detected by the second illuminance sensing unit 150, when the folding angle between the first body 10 and the second body 20 is less than the illuminance threshold angle. And, in another embodiment, the processor 160 can set at least one illuminance of the first display screen and the second display screen based on a greater illuminance value among the detected first illuminance value and the second illuminance value. Regarding this, it shall be explained with reference to embodiments of FIG. 4 to FIG. 10.

Besides, although it is not depicted in FIG. 1, the foldable display device 100 can further include at least one of a storage unit, a communication unit, and a power unit.

The storage unit can store such various digital data as an audio, a picture, a video, an application, and the like. The storage unit indicates such various digital storage spaces as a flash memory, a RAM (random access memory), a SSD (solid state drive), and the like.

And, the storage unit can temporarily store a data received from an external device via the communication unit. In this case, the storage unit can use the data received from the external device for buffering for the foldable display device 100 to output. And, the storage unit can be connected to the foldable display device via a network while situating at an external of the foldable display device 100.

The communication unit can transceive a data with an external device by performing a communication with the external device using various protocols. The communication unit accesses an external network in wired or wireless and can transceive such a digital data as content, an application, and the like with the external network.

The power unit is a power source connected to a battery of the internal of the device or an external power supply. The power unit can supply power to the foldable display device 100.

And, the foldable display device 100 depicted in FIG. 1 is a block diagram according to one embodiment. Blocks represented in a manner of being separated indicate the logically distinguished elements of the device. Hence, the elements of the aforementioned device can be equipped with a single chip or a plurality of chips according to the design of the device.

As one embodiment of the present specification, operations performed by the foldable display device 100 can be controlled by the processor 160. For clarity, in the following description and diagrams, these operations are commonly depicted and explained in a manner that the foldable display device performs/controls the operations.

FIG. 2 is a diagram indicating one embodiment of a foldable display device of the present specification. More specifically, FIG. 2 (a) indicates a first side of the foldable display device 100, FIG. 2 (b) indicates a second side of the foldable display device 100, and FIG. 2 (c) indicates the first side of the foldable display device 100.

As depicted in FIG. 2, the foldable display device 100 can include a first body 10 and a second body 20. As mentioned earlier in FIG. 1, the first 10 and the second body 20 can be provided in the display unit. And, the first body and the second body can be positioned side by side with each other. And, the first body 10 can include a first display screen 11 and the second body 20 can include a second display screen 21. And, the first 11 and the second display screen 21 can be provided at the first side of the foldable display device 100.

Meanwhile, as depicted in FIG. 2 (a), the foldable display device 100 can include a plurality of display units. For instance, the foldable display device 100 can include 2 display units, i.e., the first display unit and the second display unit. In this case, the first display unit includes the first display screen 11 supported by the first body 10 and the second display unit can include the second display screen 21 supported by the second body 20. And, the first and the second display unit can be folded in a direction that the first 11 and the second display screen 21 are facing with each other.

And, as shown in FIG. 2 (c), the foldable display device 100 can include one display unit. In this case, the display unit can include the first display screen 11 supported by the first body 10 and the second display screen supported by the second body 20. And, the display unit can be folded in a direction that the first display screen 11 and the second display screen 21 are facing with each other based on a center of the display unit.

And, referring to FIG. 2 (b), the foldable display device 100 can include a third display screen 12. In this case, the third display screen 12 can be provided at an opposite side of the first display screen 11. And, the third display screen 12 can be supported by the first body 10. And, the third display screen 12 can be selectively provided in the display unit. Yet, in FIG. 4 to FIG. 10, the third display screen 12 is explained under an assumption that the third display screen is provided in the display unit.

And, the foldable display device 100 can include a plurality of illuminance sensing units. For instance, as shown in FIG. 2 (a), the foldable display device 100 can include a first illuminance sensing unit 140. As an example, the first illuminance sensing unit 140 can be provided in the first side of the second body 20. More specifically, the foldable display device 100 can include the first illuminance sensing unit 140 in a bezel area of the second body 20. As a different example, although it is not depicted in FIG. 2, a first illuminance sensing unit 150 can be provided in the first side of the first body 10.

And, for instance, as shown in FIG. 2 (b), the foldable display device 100 can include a second illuminance sensing unit 150. In one embodiment, the second illuminance sensing unit 150 can be provided in the second side of the first body 10. More specifically, the foldable display device 100 can include the second illuminance sensing unit 150 in a bezel area of the first side of the first body 10. In another embodiment, a second illuminance sensing unit 160 can be provided in the second side of the second body 20.

As mentioned in the foregoing description, the foldable display device 100 can include a plurality of illuminance sensing units in both sides. And, the foldable display device 100 can set the illuminance of the first display screen, the second display screen, and the third display screen 11/12/21 based on an illuminance value detected by the illuminance sensing units, which are provided at the both sides. In the following FIG. 3 to FIG. 10, a method of configuring illuminance of a screen according to a folding angle of the foldable display device 100 is described.

FIG. 3 is a diagram indicating one embodiment for an illuminance threshold angle and a display threshold angle of a foldable display device of the present specification. More specifically, FIG. 3 (a) indicates an illuminance threshold value of the foldable display device 100 and FIG. 3 (b) indicates a display threshold angle of the foldable display device 100.

First of all, an angle $\alpha$ shown in FIG. 3 (a) may indicate an illuminance threshold angle. In this case, the illuminance threshold angle indicates a reference angle by which an illuminance sensing unit providing an illuminance value to the display screen provided in the foldable display device 100 is determined. In particular, by comparing a folding angle between the first body 10 and the second body 20 with the illuminance threshold angle, the illuminance sensing unit providing the illuminance value, which is used for configuring illuminance before and after the illuminance threshold angle, may change. For instance, the illuminance threshold angle may correspond to a 120 degree angle. And, the illuminance threshold angle is not a fixed angle and can be determined based on a size, a type, brightness of surroundings, a user configuration, a position of the illuminance sensing unit, and the like of the foldable display device 100.

An angle $\beta$ shown in FIG. 3 (b) may indicate a display threshold angle. In this case, if the foldable display device 100 is unfolded from a state of being folded, the display threshold angle indicates the angle activating at least one of the first display screen and the second display screen, which are situating at the first side. And, if the foldable display device 100 is folded from a state of being unfolded, the display threshold angle may indicate the angle deactivating the first display screen and the second display screen, which are situating at the first side. For instance, the display threshold angle may correspond to a 30 degree angle. And, the display threshold angle is not a fixed angle and can be determined based on a size, user configuration, a position of the illuminance sensing unit, and the like of the foldable display device 100.

Meanwhile, in the present specification, the display threshold angle may correspond to a smaller angle compared to the illuminance threshold angle. Yet, the illuminance threshold angle may correspond to a smaller angle compared to the display threshold angle by a configuration.

In the following description, a method of configuring illuminance of a display screen according to a folding angle between a first body 10 and a second body 20 is explained under an assumption that the foldable display device 100 is positioned under a lamp in FIG. 4 to FIG. 8. And, embodiment in FIG. 4 to FIG. 8 is described under an assumption that the foldable display device 100 is put on a desk or a floor.

In one embodiment, the foldable display device 100 can set illuminance of at least one of the first display screen 11 and the second display screen 21 in the first side based on a first illuminance value detected by a first illuminance sensing unit 140 of the first side, when the folding angle between the first body 10 and the second body 20 is equal to an illuminance threshold angle or greater than the illuminance threshold angle. In this case, the first illuminance value may correspond to an illuminance value of an external environment detected by the first illuminance sensing unit 150. In this case, the foldable display device 100 may configure illuminance of a third display screen 12 of a second side based on the first illuminance value. Regarding this, it shall be described in FIG. 7 and FIG. 8.

In another embodiment, the foldable display device 100 can set the illuminance of at least one of the first display screen 11 and the second display screen 21 in the first side based on a second illuminance value detected by a second illuminance sensing unit 150 of the second side, when the folding angle between the first body 10 and the second body 20 is smaller than the illuminance threshold angle. In this case, the second illuminance value may correspond to an illuminance value of an external environment detected by the second illuminance sensing unit 150. In this case, the foldable display device 100 may configure illuminance of the third display screen 12 of the second side based on the second illuminance value. Regarding this, it shall be described in FIG. 4 to FIG. 6.

FIG. 4 is a diagram indicating a first embodiment of an illuminance setting according to a folding angle of a foldable display device of the present specification.

More specifically, in case that the folding angle between the first body 10 and the second body 20 corresponds to 0 degree, FIG. 4 indicates an illuminance setting of a screen provided in the foldable display device 100.

If the foldable display device 100 is in a state of being folded, the foldable display device 100 can provide a second side to a user. This is because a first side, which is provided at an inside of the foldable device, cannot be seen to the user, since the first side is folded. For instance, as shown in FIG. 4 (*a*), the foldable display device 100 can provide a third display screen 12 positioned at the second side of the first body 10 to the user. In this case, as depicted in FIG. 4 (*b*), the state of being folded may correspond to a case that the first body 10 and the second body 20 face one another.

And, if the foldable display device 100 is in a state of being folded, the foldable display device 100 can deactivate a first display screen (not depicted) and a second display screen (not depicted), which are positioned at the first side. This is because the user cannot use the first side provided at the inside of the foldable display device 100.

Meanwhile, if the third screen 12 is provided, the foldable display device 100 can activate the third display screen 12. For instance, if an input signal of the user for the third display screen 12 is detected, the foldable display device 100 can activate the third display screen 12. In this case, the input signal can include a touch input of the user and the like for a software key or a hardware key of the foldable display device 100.

In this case, a first illuminance sensing unit (not depicted) provided in the first side of the foldable display device 100 is in a state not capable of detecting illuminance of an external environment. This is because it is difficult for the first illuminance sensing unit (not depicted) positioned at an inside of the foldable display device 100 to measure the illuminance of the external environment, since the first body 10 and the second body 20 face one another. Hence, for instance, if the foldable display device 100 recognizes that the foldable display device is in the state of being folded, the foldable display device may control the first illuminance sensing unit (not depicted) not to perform an illuminance detecting.

Meanwhile, in this case, as shown in FIG. 4 (*a*), a second illuminance sensing unit 160 is provided at an external of the foldable display device 100 and can easily detect illuminance of an external environment of the foldable display device 100. Hence, the foldable display device can detect the illuminance of the external environment by the second illuminance sensing unit 150 provided in a second side of the foldable display device 100.

Hence, if the folding angle between the first body 10 and the second body 20 correspond to 0 degree, the foldable display device 100 can set illuminance of the third display screen 12 based on a second illuminance value detected by the second illuminance sensing unit 150 provided in the second side. More specifically, the foldable display device 100 can set the illuminance of the third display screen 12 based on the second illuminance value detected by the second illuminance sensing unit 150 provided in the second side in case that the third display screen 12 provided in the second side is activated.

For instance, if the external environment is in a state of dark, the foldable display device 100 can configure the illuminance of the third display screen 12 to be darkened based on the second illuminance value detected by the second illuminance sensing unit 150. And, for instance, if the external environment is in a state of bright, the foldable display device 100 can configure the illuminance of the third display screen 12 to be brightened based on the second illuminance value detected by the second illuminance sensing unit 150.

Meanwhile, if the third display screen is not provided in the second side of the first body 10, the foldable display device 100 may not use the second illuminance value detected by the second illuminance sensing unit 150 in configuring illuminance. And, if the third display screen 12 is not activated, the foldable display device 100 may not use the second illuminance value detected by the second illuminance sensing unit 150 although the third display screen 12 is provided in the second side of the first body 10.

FIG. 5 is a diagram indicating a second embodiment of an illuminance setting according to a folding angle of a foldable display device of the present specification.

More specifically, FIG. 5 indicates an illuminance setting of a display screen provided in the foldable display device 100 in case that a folding angle between a first body 10 and a second body 20 corresponds to a1. In this case, the angle a1 may correspond to an angle smaller than the display threshold angle and the illuminance threshold angle depicted in FIG. 3 ($\beta<\alpha<a1$).

As shown in FIG. 5 (*b*), if the folding angle between the first body 10 and the second body 20 corresponds to a1, the foldable display device 100 can provide a third display screen 12 to a user. And, the foldable display device 100 can provide a part of a second display screen to the user according to a position of the user for the foldable display device 100.

And, if the folding angle corresponds to the a1, the foldable display device 100 can deactivate a first display screen and a second display screen 21, which are provided at a first side. This is because the angle a1 corresponds to an angle smaller than the display threshold angle, which is required to activate a display screen positioned at the first side. And, this is because the user is not easy to use content in the angle a1 although the content is displayed in the first side of the foldable display device 100.

Meanwhile, referring to FIG. 5 (*a*), the foldable display device 100 can detect illuminance of an external environment by a first illuminance sensing unit (not depicted) and a second illuminance sensing unit 150. In this case, the first illuminance sensing unit (not depicted) can detect a lower illuminance value compared to the second illuminance sensing unit 150. This is because the first illuminance sensing unit (not depicted) is positioned at an inside of the foldable display device 100. Since a shadow may be generated by the first body 10 in the angle a1, the first illuminance sensing unit may detect an illuminance value lower than the illuminance value of an actual external environment.

Hence, in this case, the foldable display device 100 can set illuminance of the display screen based on a second illuminance value detected by the second illuminance sensing unit 160. Meanwhile, if the folding angle corresponds to the a1, the foldable display device 100 can be set to control the display screen based on the second illuminance value detected by the second illuminance sensing unit 150.

Hence, if the third display screen 12 positioned at an external is activated, the foldable display device 100 can set the illuminance of the third display screen based on the second illuminance value detected by the second illuminance sensing unit 150, which is provided in the second side of the foldable display device.

Meanwhile, in one embodiment, if the foldable display device 100 is in a state of being folded, in particular, if an angle between the first body 10 and the second body 20 is getting smaller, the first and the second display screen can be deactivated from an angle corresponding to the display threshold angle, which is greater than the a1 angle, until the foldable display device is folded. And, if the foldable display device 100 is in a state of being folded, since the first and the second display screen are deactivated, the third display screen 12 can be activated for convenience of a user. In this case, illuminance of the activated third display screen 12 can be set based on the second illuminance value, which is detected by the second illuminance sensing unit 150 provided in the second side of the foldable display device.

In another embodiment, if the foldable display 100 is in a state of being unfolded, in particular, if the angle between the first body 10 and the second body 20 is getting larger, the first and the second display screen 21 can be in a deactivated state until the a1 angle. And, if the foldable display 100 is in a state of being unfolded, the third display screen 12 can be activated until the foldable display device is unfolded as much as the display threshold angle, for convenience of a user. In this case, illuminance of the activated third display screen 12 can be set based on the second illuminance value, which is detected by the second illuminance sensing unit 160 provided in the second side of the foldable display device.

FIG. 6 is a diagram indicating a third embodiment of an illuminance setting according to a folding angle of a foldable display device of the present specification.

More specifically, FIG. 6 indicates an illuminance setting of a display screen provided in the foldable display device 100 in case that a folding angle between a first body 10 and a second body 20 corresponds to a2. In this case, the angle a2 may correspond to an angle greater than the display threshold angle depicted in FIG. 3 and smaller than the illuminance threshold angle. (β<a2<α)

As shown in FIG. 6 (b), if the folding angle between the first body 10 and the second body 20 corresponds to a2, the foldable display device 100 can provide a third display screen 12 to a user. And, if the folding angle between the first body 10 and the second body 20 corresponds to a2, the foldable display device 100 can provide a second display screen 21 to the user.

And, if the folding angle corresponds to the a2, the foldable display device 100 can activate at least one of the first display screen and the second display screen 21, which are positioned at the first side of the foldable display device. This is because the angle a2 corresponds to an angle greater than the display threshold angle, which is required to activate a display screen positioned at the first side.

For instance, if the first 11 and the second display screen 21 are included in one display unit, the foldable display device 100 can activate the first 11 and the second display screen 21. And, for instance, if the first 11 and the second display screen 21 are included in separate display units, respectively, the foldable display device 100 can activate either the first display screen or the second display screen. And, for instance, if it is easy to use the second display screen 21 in terms of a user, the foldable display device 100 can activate the second display screen 21.

And, in this case, the foldable display device can activate a third display screen 12. In particular, a user can use both an internal screen and an external screen of the foldable display device 100 at the same time. Meanwhile, if at least one of the first display screen and the second display screen is activated, the foldable display device 100 may deactivate the third display screen 12 according to a setting. This is because it may be difficult for a user to use both the first and the second side at the same time and it is necessary to reduce power consumption.

Meanwhile, the foldable display device 100 can sense illuminance of an external environment by a first illuminance sensing unit 140 and a second illuminance sensing unit 150. In this case, the first illuminance sensing unit 140 can detect a lower illuminance value compared to the second illuminance sensing unit 160. As mentioned earlier in FIG. 5, this is because the first illuminance sensing unit 140 is positioned at an inside of the foldable display device 100. Since a shadow may be generated by the first body 10 in the angle a2, the first illuminance sensing unit may detect an illuminance value lower than the illuminance value of an actual external environment.

Hence, in this case, the foldable display device 100 can set illuminance of the display screen based on a second illuminance value detected by the second illuminance sensing unit 150, which is positioned at the external of the foldable display device 100. And, if the folding angle corresponds to the a2, since the a2 angle corresponds to an angle smaller than the illuminance threshold angle, the foldable display device 100 can be set to control the illuminance of the display screen based on the second illuminance value detected by the second illuminance sensing unit 150.

Hence, the foldable display device 100 can set illuminance of at least one of the first display screen 11 and the second display screen, which are positioned at an inside of the foldable display device, based on the second illuminance value detected by the second illuminance sensing unit 150. And, if the third display screen 12 is activated, the foldable display device 100 can set the illuminance of the third display screen 12 positioned at the external of the foldable display device based on the second illuminance value detected by the second illuminance sensing unit 150.

If the first display screen, the second display screen and the third display screen are activated, the foldable display device 100 can identically set the illuminance of the first and the second display screen. This is because if a user uses content displayed in the first side, it is natural to see the identical illuminance of the first and the second display screen. And, the foldable display device 100 may set the illuminance of the third display screen in a manner of being different from the illuminance of the first display screen and the second display screen. This is because the illuminance of an external environment of the first side at which the first and the second display screen are positioned is different from the illuminance of the external environment of the second side at which the third display screen is positioned.

In one embodiment, if the foldable display device is in a state of being folded, in particular, if an angle between the first body 10 and the second body 20 is getting smaller, it may correspond to a case that a user intends to mainly use the third display screen 12 positioned at the external of the foldable display device by folding the foldable display device 100. Hence, in this case, the foldable display device 100 can set the illuminance of the third display screen 12 positioned at the second side relatively brighter than the illuminance of the first 11 display screen and the second display screen 21, which are positioned at the first side, in the a2 angle. In this case, the illuminance of the display screen can be set based on the second illuminance value detected by the second illuminance sensing unit 150.

In another embodiment, if the foldable display device is in a state of being unfolded, in particular, if the angle between the first body 10 and the second body 20 is getting larger, it may correspond to a case that the user intends to mainly use at least one of the first display screen 11 and the second display screen 21, which are positioned at inside of the foldable display device, by unfolding the foldable display device 100. Hence, in this case, the foldable display device 100 can set the illuminance of the first 11 and the second display screen 21 positioned at the first side relatively brighter than the illuminance of the third display screen 12 positioned at the second side in the a2 angle.

FIG. 7 is a diagram indicating a fourth embodiment of an illuminance setting according to a folding angle of a foldable display device of the present specification.

More specifically, FIG. 7 indicates an illuminance setting of a display screen provided in the foldable display device 100 in case that a folding angle between a first body 10 and a second body 20 corresponds to a3. In this case, the angle a3 may correspond to an angle greater than the display threshold angle depicted in FIG. 3 and the illuminance threshold angle. ($\beta<\alpha<a3$)

As shown in FIG. 7 (b), if the folding angle between the first body 10 and the second body 20 corresponds to a3, the foldable display device 100 can provide a first display screen 11 and a second display screen 21 to a user. In particular, if the folding angle corresponds to the a3 angle, the user can use content via a first side.

And, if the folding angle corresponds to the a3, the foldable display device 100 can activate at least one of the first display screen 11 and the second display screen 21, which are positioned at the first side of the foldable display device. This is because the angle a3 corresponds to an angle greater than the display threshold angle, which is required to activate a display screen positioned at the first side.

For instance, the foldable display device 10 can activate both the first 11 and the second display screen 21 in the a3 angle according to a configuration. And, for instance, the foldable display device 10 may use one side display screen only by activating either the first display screen 11 or the second display screen 21.

On the other hand, if the folding angle corresponds to the a3 angle, the foldable display device 100 can deactivate a third display screen (not depicted) positioned at the second side. This is because it is convenient for a user to mainly use the first display screen 11 and the second display screen 21, which are positioned at the first side, in the a3 angle. Yet, the foldable display device 100 may activate the third display screen (not depicted) according to a setting although the folding angle corresponds to the a3 angle.

Meanwhile, the foldable display device 100 can sense illuminance of an external environment by a first illuminance sensing unit 140 and a second illuminance sensing unit 150. In this case, if the folding angle of the foldable display device 100 corresponds to the a3 angle, the first illuminance sensing unit 150 can detect an illuminance value higher than the illuminance value detected by the second illuminance sensing unit (not depicted). This is because the first illuminance sensing unit 140 can more easily detect the illuminance of the external environment, since the first illuminance sensing unit 150 positioned at the first side is facing the external environment and the second illuminance sensing unit (not depicted) positioned at the second side is positioned at the opposite side.

Hence, in this case, the illuminance of the display screen can be set based on the first illuminance value detected by the first illuminance sensing unit 140, which is positioned at the inside of the foldable display device 100. And, since the folding angle corresponds to the a3 angle, the foldable display device 100 can be set to control the display screen based on the first illuminance value detected by the first illuminance sensing unit 140.

And, at least one of the first display screen 11 and the second display screen 21 can be activated irrespective of the folding or unfolding of the foldable display device 100. And, the illuminance of at least one of the activated first display screen 11 and the activated second display screen 21 can be set based on the first illuminance value detected by the first illuminance sensing unit 150. Meanwhile, in this case, a third display screen 12 can be deactivated irrespective of the folding or unfolding of the foldable display device.

Figure 8:
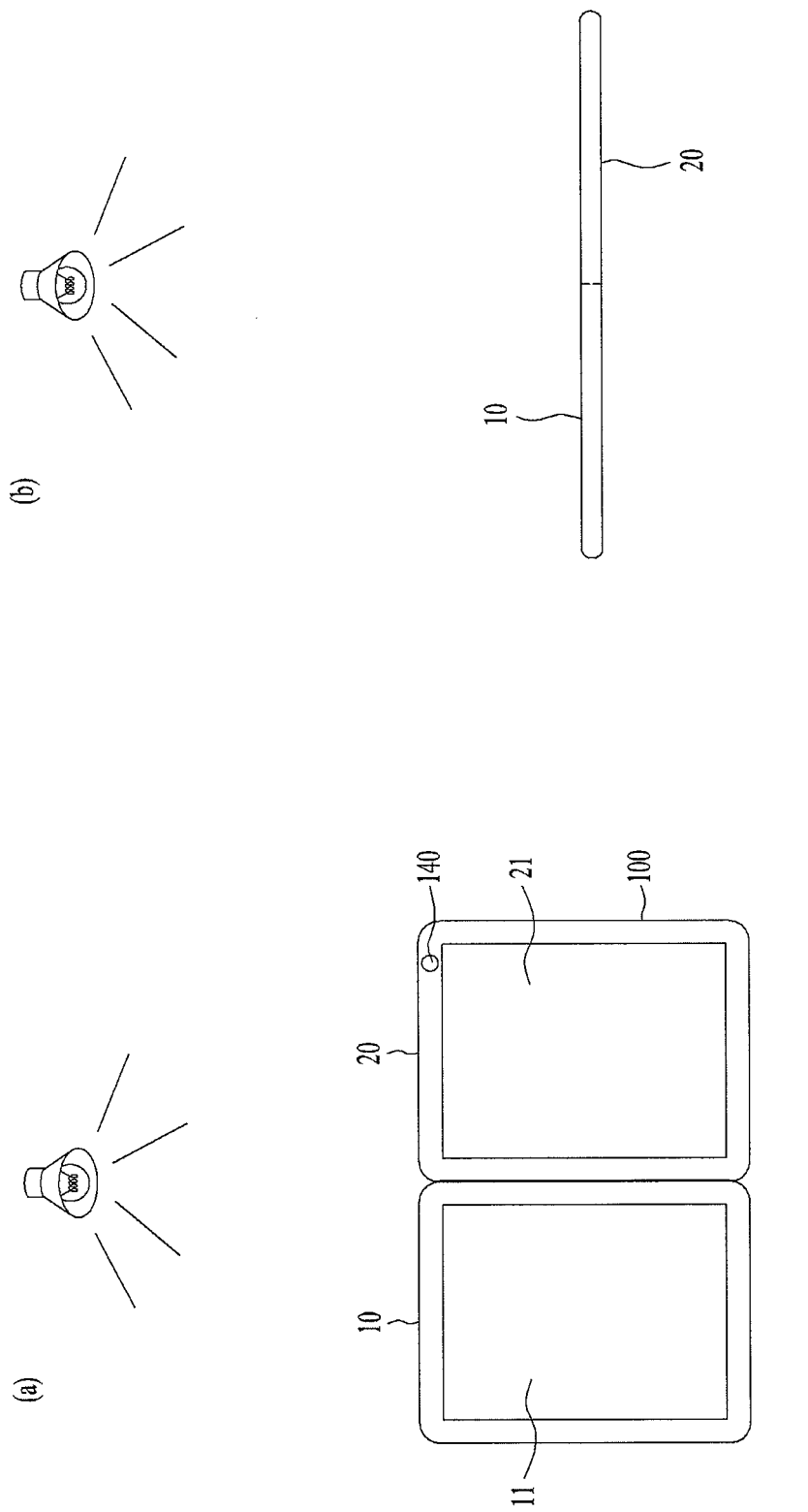
FIG. 8 is a diagram indicating a fifth embodiment of an illuminance setting according to a folding angle of a foldable display device of the present specification.

FIG. 8 is a diagram indicating a fifth embodiment of an illuminance setting according to a folding angle of a foldable display device of the present specification.

More specifically, FIG. 8 indicates an illuminance setting of a display screen provided in the foldable display device 100 in case that a folding angle between a first body 10 and a second body 20 corresponds to 180 degree angle.

If the foldable display device 100 is in a state of being unfolded, the foldable display device 100 can provide a first display screen 11 and a second display screen 21 to a user. In this case, as shown in FIG. 8 (b), the state of being unfolded may indicate a case that the folding angle between the first body 10 and the second body 20 corresponds to 180 degree angle.

And, if the foldable display device is in a state of being unfolded, the foldable display device 100 can deactivate a third display screen (not depicted) positioned at a second side. This is because it may be difficult for a user to simultaneously use the second side while a first side of the foldable display device is used by the user.

Meanwhile, in this case, since the foldable display device 100 is in a state of being unfolded, the second illuminance sensing unit (not depicted) provided in the second side may be in a state not capable of detecting the illuminance of an external environment. This is because if the foldable display device 100 is put on a floor, it may be difficult for the second illuminance sensing unit (not depicted) to detect the illuminance of the external environment. Hence, for instance, if the foldable display device 100 recognizes a state that the foldable display device is unfolded, the foldable display device can control the second illuminance sensing unit (not depicted) not to perform an illuminance detecting.

And, in this case, as depicted in FIG. 8 (a), the first illuminance sensing unit 150 can easily detect illuminance of an external environment of the foldable display device by positioning at an internal of the foldable display device 100.

Hence, the foldable display device can detect the illuminance of the external environment by the first illuminance sensing unit 140 provided in the first side.

Hence, if the folding angle between the first body 10 and the second body 20 corresponds to 180 degree angle, the foldable display device 100 can set the illuminance of at least one of the first display screen 11 and the second display screen 21 based on the first illuminance value detected by the first illuminance sensing unit 140, which is provided in the first side. For instance, if the first display screen 11 and the second display screen 21 are included in one display unit, the foldable display device 100 can set the illuminance of the first display screen 11 and the second display screen 21 based on the first illuminance value. More specifically, if the first display screen 11 and the second display screen 21 are activated, the foldable display device 100 can set the illuminance of the first display screen 11 and the second display screen 21 based on the first illuminance value.

Meanwhile, although it is not depicted in FIG. 8, if the folding angle between the first body 10 and the second body 20 exceeds 180 degree angle, the foldable display device 100 can set the illuminance of at least one of the first display screen 11 and the second display screen 21 as well.

Figure 9:
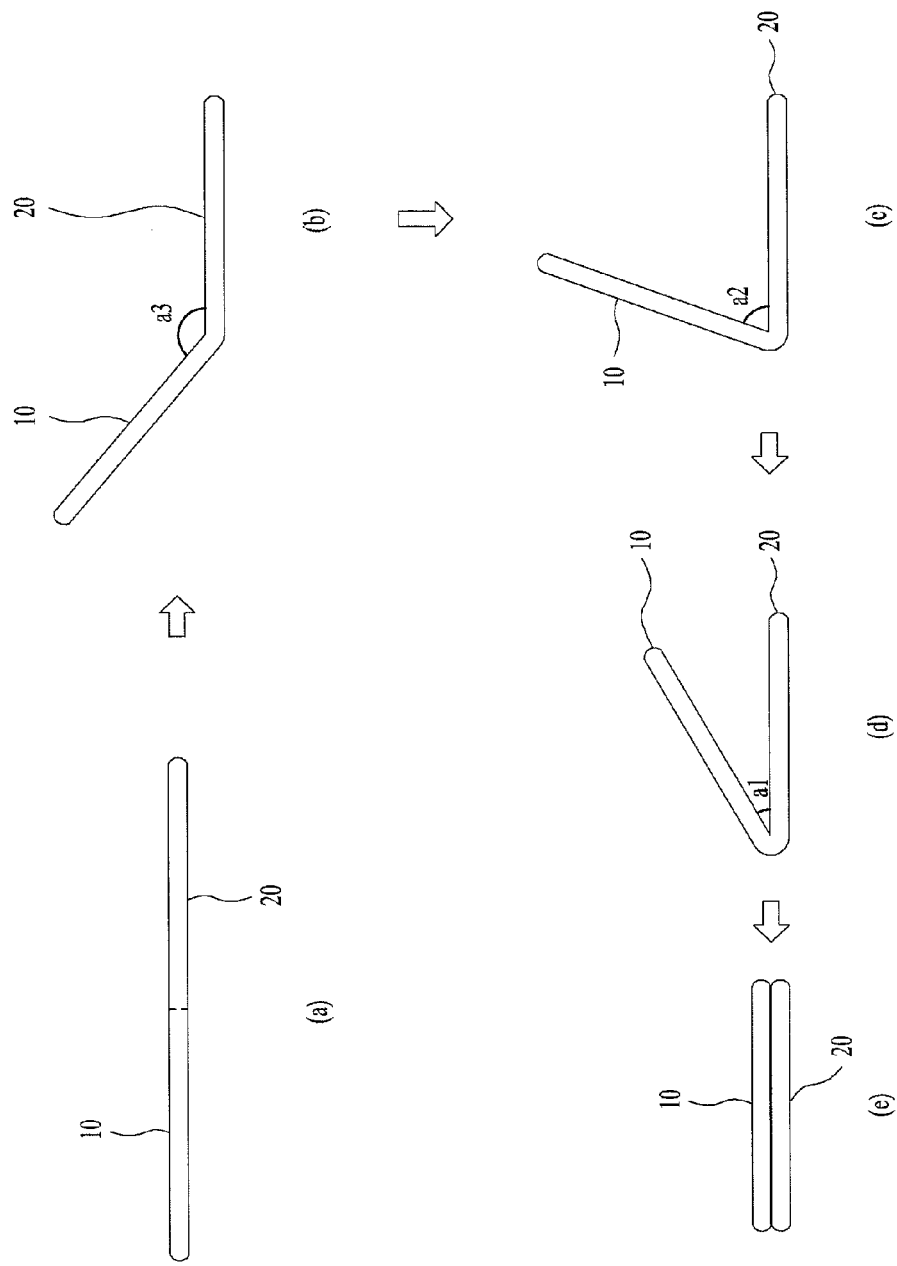
FIG. 9 is a diagram indicating a first embodiment of illuminance change according to a change of a folding angle of a foldable display device of the present specification.

FIG. 9 is a diagram indicating a first embodiment of illuminance change according to a change of a folding angle of a foldable display device of the present specification.

More specifically, if the foldable display device 100 converts from a folded state to an unfolded state, FIG. 9 indicates an illuminance setting of a display screen according to a folding angle. And, embodiments of FIG. 9 are described under an assumption that the foldable display device 100 is equipped with a first display screen, a second display screen and a third display screen.

For instance, the foldable display device 100 can set illuminance of a display screen based on a second illuminance value detected by a second illuminance sensing unit of a second side from the folded state until the folding angle between a first body 10 and a second body 20 corresponds to an illuminance threshold angle. And, if the folding angle between the first body 10 and the second body 20 is equal to the illuminance threshold angle or greater than the illuminance threshold angle, the foldable display device 100 can set the illuminance of the display screen based on a first illuminance value detected by a first illuminance sensing unit of a first side.

And, for instance, if the foldable display device is in a state of being unfolded, the foldable display device 100 can set the illuminance of the display screen based on a higher illuminance value among the first illuminance value detected by the first illuminance sensing unit and the second illuminance value detected by the second illuminance sensing unit.

First of all, as shown in FIG. 9 (a), the foldable display device 100 can be in a folded state. In this case, the display screen positioned at the first side is deactivated and a third display screen positioned at the second side can be activated. Hence, as mentioned earlier in FIG. 4, the foldable display device 100 can set illuminance of the third display screen based on the second illuminance value detected by the second illuminance sensing unit (not depicted).

As depicted in FIG. 9 (b), the foldable display device 100 can be in a case that the folding angle between the first body 10 and the second body 20 corresponds to an a1 angle in the middle of being unfolded. In this case, the display screen positioned at the first side is deactivated and the third display screen positioned at the second side can be activated. In this case, as mentioned earlier in FIG. 5, the a1 angle may correspond to an angle smaller than the display threshold angle and the illuminance threshold angle.

Hence, the foldable display device 100 can set the illuminance of the third display screen based on the second illuminance value detected by the second illuminance sensing unit. This is because the a1 angle corresponds to an angle smaller than the illuminance threshold angle. And, this is because the second illuminance value has a higher illuminance value compared to the first illuminance value.

As shown in FIG. 9 (c), the foldable display device 100 can be in a case that the folding angle between the first body 10 and the second body 20 corresponds to an a2 angle in the middle of being unfolded. In this case, since the a2 angle is larger than the display threshold angle, at least one of the first display screen and the second display screen, which are positioned at the first side, can be activated. In this case, as mentioned earlier in FIG. 6, the a2 angle may correspond to an angle larger than the display threshold angle and smaller than the illuminance threshold angle.

Hence, the foldable display device 100 can set the illuminance of at least one of the first display screen and the second display screen based on the second illuminance value detected by the second illuminance sensing unit. This is because the a2 angle corresponds to an angle smaller than the illuminance threshold angle. And, this is because the second illuminance value has a higher illuminance value compared to the first illuminance value.

As shown in FIG. 9 (d), the foldable display device 100 can be in a case that the folding angle between the first body 10 and the second body 20 corresponds to an a3 angle in the middle of being unfolded. In this case, since the a3 angle is larger than the display threshold angle, at least one of the first display screen and the second display screen, which are positioned at the first side, can be activated. In this case, as mentioned earlier in FIG. 7, the a3 angle may correspond to an angle larger than the display threshold angle and the illuminance threshold angle.

Hence, the foldable display device 100 can set the illuminance of at least one of the first display screen and the second display screen based on the first illuminance value detected by the first illuminance sensing unit. This is because the a3 angle corresponds to an angle larger than the illuminance threshold angle. And, this is because the first illuminance value has a higher illuminance value compared to the second illuminance value.

As shown in FIG. 9 (e), the foldable display device 100 can be in an unfolded state. In this case, as mentioned earlier in FIG. 8, the foldable display device can control the second illuminance sensing unit not to detect the illuminance of an external environment. Hence, the foldable display device 100 can set the illuminance of at least one of the first display screen and the second display screen based on the first illuminance value detected by the first illuminance sensing unit.

According to the aforementioned embodiments of FIG. 9, the foldable display device 100 can determine an illuminance sensing unit, which is used to set an illuminance of a display screen, by comparing a set illuminance threshold angle with a folding angle between the first body 10 and the second body 20. And, the foldable display device 100 compares a level of the first illuminance value with a size of the second illuminance value in a random folding angle between the first body 10 and the second body 20. And then, the foldable display device can determine an illuminance sensing unit including a larger illuminance value in size as the illuminance sensing unit used for the illuminance setting of the display screen.

Figure 10:
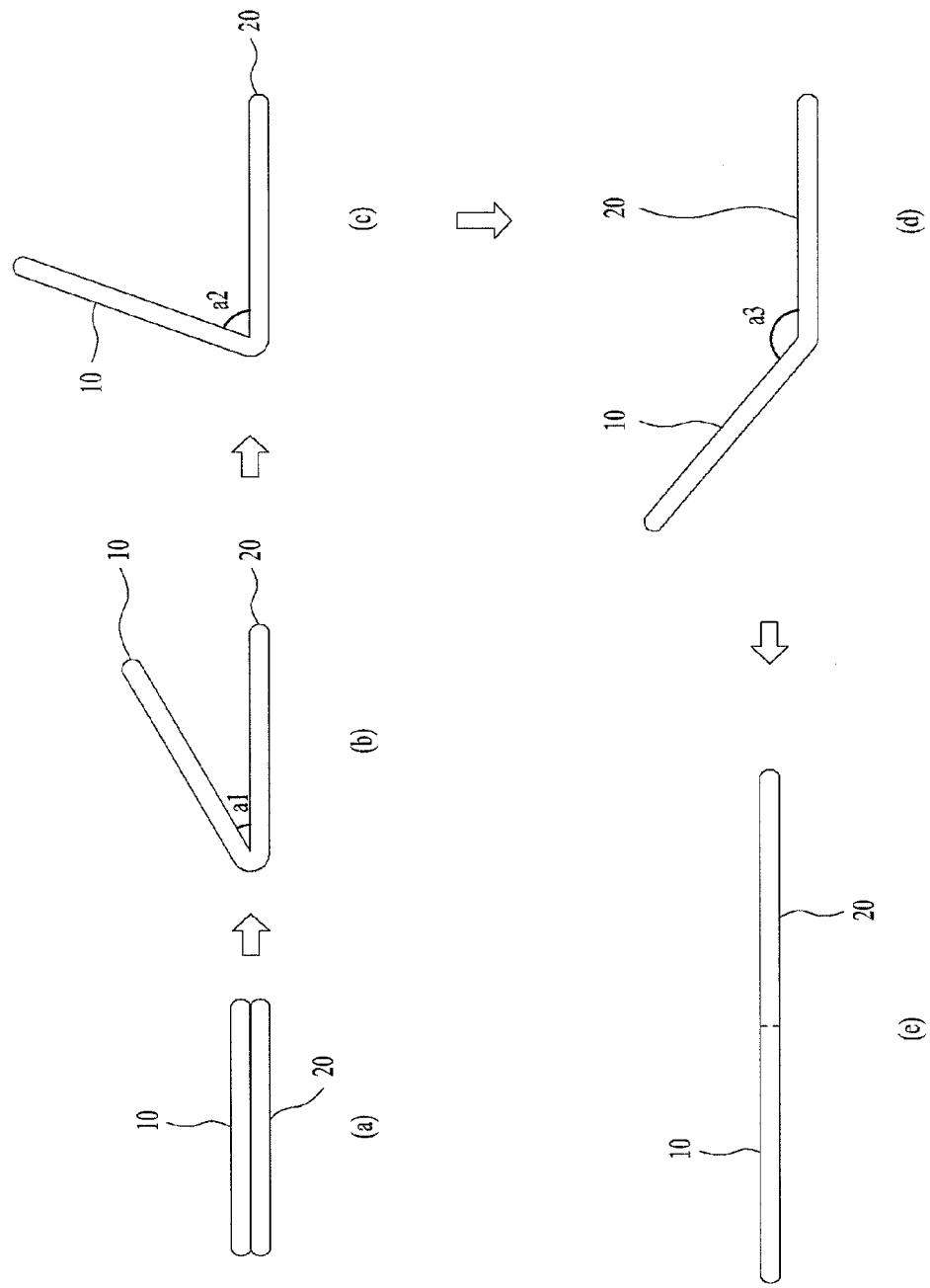
FIG. 10 is a diagram indicating a second embodiment of illuminance change according to a change of a folding angle of a foldable display device of the present specification.

FIG. 10 is a diagram indicating a second embodiment of illuminance change according to a change of a folding angle of a foldable display device of the present specification.

More specifically, if the foldable display device 100 converts from an unfolded state to a folded state, FIG. 10 indicates an illuminance setting of a display screen according to a folding angle. And, embodiments of FIG. 10 are described under an assumption that the foldable display device 100 is equipped with a first display screen, a second display screen and a third display screen.

For instance, the foldable display device 100 can set illuminance of a display screen based on a first illuminance value detected by a first illuminance sensing unit of a first side from the unfolded state until the folding angle between a first body 10 and a second body 20 corresponds to an illuminance threshold angle. And, if the folding angle between the first body 10 and the second body 20 is smaller than the illuminance threshold angle, the foldable display device 100 can set the illuminance of the display screen based on a second illuminance value detected by a second illuminance sensing unit of a second side.

And, for instance, if the foldable display device is in a state of being folded, the foldable display device 100 can set the illuminance of the display screen based on a higher illuminance value among the first illuminance value detected by the first illuminance sensing unit and the second illuminance value detected by the second illuminance sensing unit.

First of all, as shown in FIG. 10 (*a*), the foldable display device 100 can be in an unfolded state. In this case, as mentioned earlier in FIG. 8, the foldable display device 100 can activate at least one of the first display screen and the second display screen. And, the foldable display device 100 can set the illuminance of at least one of the first display screen and the second display screen based on the first illuminance value detected by the first illuminance sensing unit.

As depicted in FIG. 10 (*b*), the foldable display device 100 can be in a case that the folding angle between the first body 10 and the second body 20 corresponds to an a3 angle in the middle of being folded. In this case, as mentioned earlier in FIG. 7, the a3 angle may correspond to an angle larger than the display threshold angle and the illuminance threshold angle. Hence, the foldable display device 100 can set the illuminance of at least one of the first display screen and the second display screen based on the first illuminance value detected by the first illuminance sensing unit. This is because the first illuminance value has a higher illuminance value compared to the second illuminance value.

As shown in FIG. 10 (*c*), the foldable display device 100 can be in a case that the folding angle between the first body 10 and the second body 20 corresponds to an a2 angle in the middle of being folded. In this case, as mentioned earlier in FIG. 6, the a2 angle may correspond to an angle larger than the display threshold angle and smaller than the illuminance threshold angle. Hence, the foldable display device 100 can set the illuminance of at least one of the first display screen and the second display screen based on the second illuminance value detected by the second illuminance sensing unit. This is because the second illuminance value has a higher illuminance value compared to the first illuminance value.

As shown in FIG. 10 (*d*), the foldable display device 100 can be in a case that the folding angle between the first body 10 and the second body 20 corresponds to an a1 angle in the middle of being folded. In this case, as mentioned earlier in FIG. 5, the a1 angle may correspond to an angle smaller than the display threshold angle and the illuminance threshold angle. Hence, the foldable display device 100 can set illuminance of a third display screen based on the second illuminance value detected by the second illuminance sensing unit. This is because the second illuminance value has a higher illuminance value compared to the first illuminance value.

As shown in FIG. 10 (*e*), the foldable display device 100 can be in a folded state. In this case, as mentioned earlier in FIG. 4, the foldable display device 100 can set the illuminance of the third display screen based on the second illuminance value detected by the second illuminance sensing unit.

According to the aforementioned embodiments of FIG. 10, the foldable display device 100 can set an illuminance sensing unit, which is used to set an illuminance of a display screen, by comparing a set illuminance threshold angle with a folding angle between the first body 10 and the second body 20. And, the foldable display device 100 compares a size of the first illuminance value with a size of the second illuminance value in a random folding angle between the first body 10 and the second body 20. And then, the foldable display device can determine an illuminance sensing unit including a larger illuminance value in size as the illuminance sensing unit, which is used for the illuminance setting of the display screen.

Figure 11:
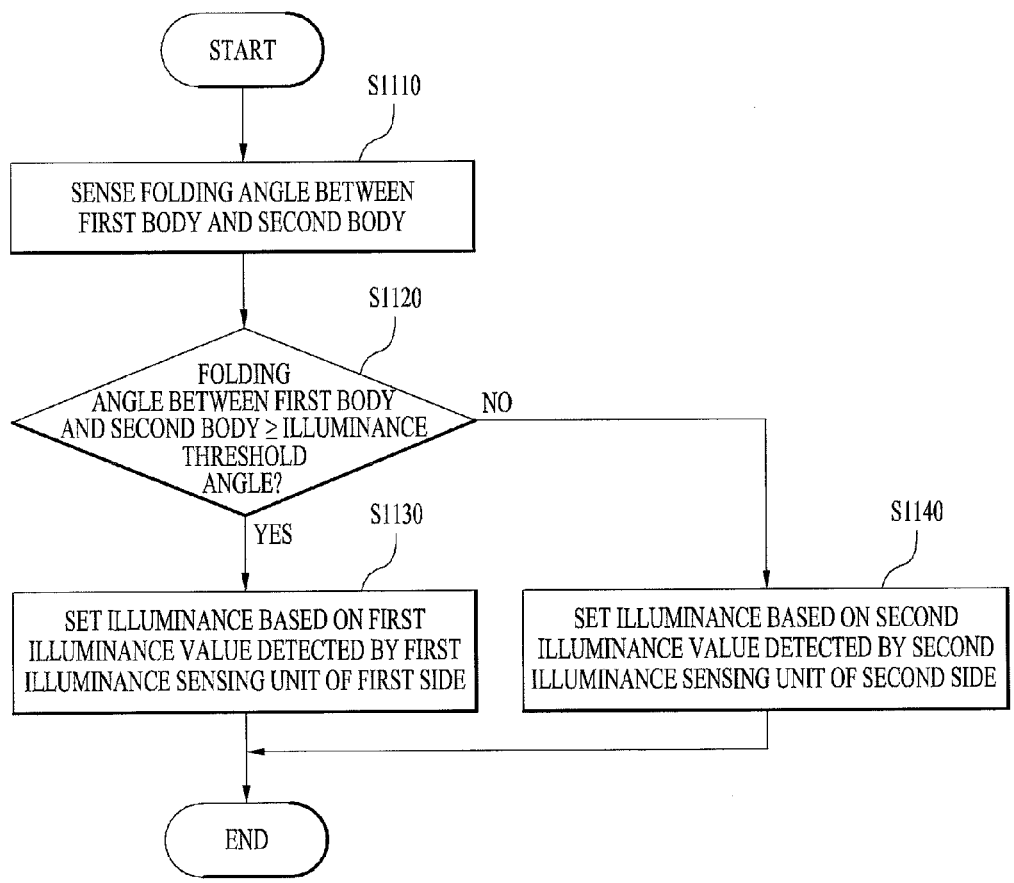
FIG. 11 is a flowchart of a method of controlling a foldable display device of the present display device.

FIG. 11 is a flowchart of a method of controlling a foldable display device of the present display device. Each step of FIG. 11 can be controlled by the processor 160 of the foldable display device shown in FIG. 1.

First of all, the foldable display device can sense a folding angle between a first body and a second body [S1110]. In this case, the first body supports a first display screen and the second body can support a second display screen. And, as mentioned earlier in FIG. 2, the first body and the second body can be connected to each other to make the first and the second display screen to be positioned at a first side.

And, the foldable display device can be folded in a direction that the first and the second display screen are facing with each other. And, as mentioned earlier in FIG. 3, if the foldable display device can be folded in the direction that the first and the second display screen are facing with each other, the folding angle may correspond to an angle formed by the first body and the second body.

The foldable display device can determine whether the folding angle between the first and the second body is larger than an illuminance threshold angle [S1120]. As mentioned earlier in FIG. 3, the illuminance threshold angle may correspond to an angle for determining an illuminance sensing unit, which provides an illuminance value to set illuminance of a display screen.

In the step of S1120, if the folding angle between the first body and the second body is equal to the illuminance threshold angle or greater than the illuminance threshold angle, the foldable display device can set illuminance of a display screen based on a first illuminance value detected by a first illuminance sensing unit of a first side [S1130]. As mentioned earlier in FIG. 7 and FIG. 8, the display screen of which illuminance is set based on the first illuminance value may correspond to an activated screen among a first display screen, a second display screen, and a third display screen. Meanwhile, if at least one of the first display screen and the second display screen is activated, the third display screen can be deactivated.

And, the third display screen is a screen positioned at an opposite side of the first display screen and can be selectively provided in the foldable display device. For instance, if the folding angle between the first and the second body is equal to the illuminance threshold angle or greater than the illuminance threshold angle, the foldable display device can set the illuminance of the third display screen of a second side based on the first illuminance value detected by the first illuminance sensing unit of the first side.

Meanwhile, in the step of S1120, if the folding angle between the first and the second body is smaller than the illuminance threshold angle, the foldable display device can set the illuminance of the display screen based on a second illuminance value detected by a second illuminance sensing unit of the second side [S1140]. As mentioned earlier in FIG. 4 to FIG. 6, the display screen of which illuminance is set based on the second illuminance value may correspond to an activated screen among the first display screen, the second display screen, and the third display screen. For instance, if the folding angle between the first and the second body is smaller than the illuminance threshold angle, the foldable display device can set the illuminance of the third screen of the second side based on the second illuminance value detected by the second illuminance sensing unit of the second side.

Meanwhile, if the first display screen, the second display screen, and the third display screen are activated, the foldable display device can set the illuminance of the first and the second display screen identically. And, if the first display screen, the second display screen, and the third display screen are activated, the foldable display device can set the illuminance of the first and the second display screen in a manner of being different from the illuminance of the third display screen. And, if the first and the second display screen are activated, the foldable display device can deactivate the third display screen according to a configuration.

FIG. 12 is a flowchart of a method of controlling a foldable display device of the present display device. Each step of FIG. 12 can be controlled by the processor 160 of the foldable display device 100 shown in FIG. 1. And, explanation on a step overlapped with the steps, which are mentioned earlier in FIG. 11, is omitted.

First of all, the foldable display device can sense a folding angle between a first body and a second body [S1210]. The foldable display device can determine whether the folding angle between the first and the second body is larger than a display threshold angle [S1220]. In this case, as mentioned earlier in FIG. 3, if the foldable display device converts from a folded state to an unfolded state, the display threshold angle may correspond to an angle for activating at least one of a first display screen and a second display screen. And, if the foldable display device converts from the unfolded state to the folded state, the display threshold angle may correspond to an angle for deactivating the first and the second display screen.

In the step of S1220, if the folding angle between the first and the second body is equal to the display threshold angle or greater than the display threshold angle, the foldable display device can activate at least one of the first and the second display screen [S1230]. Meanwhile, although it is not depicted in FIG. 12, if the folding angle between the first and the second body is smaller than the display threshold angle, the foldable display device can activate a third display screen. Since it is difficult for a user to use both the first and the second side at the same time, it is intended to provide user convenience and to reduce power consumption by activating one side only.

The foldable display device can determine whether the folding angle between the first and the second body is larger than the illuminance threshold angle [S1240]. In the step S1240, if the folding angle between the first and the second body is equal to the illuminance threshold angle or larger than the illuminance threshold angle, the foldable display device can set illuminance of a display screen based on a first illuminance value detected by a first illuminance sensing unit of a first side [S1250].

Meanwhile, in the step S1240, if the folding angle between the first and the second body is smaller than the illuminance threshold angle, the foldable display device can set the illuminance of the display screen based on a second illuminance value detected by a second illuminance sensing unit of a second side [S1260]. And, it is also possible to execute S1220 to S1230 and S1240 to S1260 in reverse order.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A foldable display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a foldable display device and a method of controlling therefor according to the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:
1. A foldable display device, comprising:
a first body configured to support a first display screen;
a second body configured to support a second display screen, wherein the first display screen and the second display screen are provided at a first side of the foldable display device;

an angle sensing unit configured to sense a folding angle between the first body and the second body, wherein the first body and the second body are foldable in a direction to which the first display screen and the second display screen are facing;

a first illuminance sensing unit installed on the first side configured to sense illuminance;

a second illuminance sensing unit installed on a second side, which is an opposite side of the first side, configured to sense illuminance; and a processor configured to control the first body, the second body, the angle sensing unit, the first illuminance sensing unit, and the second illuminance sensing unit, wherein the first body is further configured to support a third display screen, the third display screen is installed on the second side, and wherein the processor is further configured to:
  detect, via the first illuminance sensing unit installed on the first side, a first illuminance value, when the folding angle between the first body and the second body is equal to a prescribed first angle or greater than the prescribed first angle,
  adjust illuminance of at least one of the first display screen and the second display screen installed on the first side, based on the detected first illuminance value,
  detect, via the second illuminance sensing unit installed on the second side, a second illuminance value, when the folding angle between the first body and the second body is smaller than the prescribed first angle, and
  adjust illuminance of the third display screen installed on the second side, based on the detected second illuminance value.

2. The foldable display device of claim 1, wherein the processor is further configured to adjust the illuminance of at least one of the first display screen and the second display screen based on the detected first illuminance value, when at least one of the first display screen and the second display screen is activated.

3. The foldable display device of claim 1, wherein the processor is further configured to activate at least one of the first display screen and the second display screen, when the folding angle between the first body and the second body is equal to a display threshold angle or greater than the display threshold angle.

4. The foldable display device of claim 3, wherein the prescribed first angle corresponds to an angle greater than the display threshold angle.

5. The foldable display device of claim 1, wherein the processor is further configured to deactivate the third display screen, when at least one of the first display screen and the second display screen is activated.

6. The foldable display device of claim 1, wherein the processor is further configured to identically adjust illuminance of the first display screen and the second display screen, when the first display screen, the second display screen, and the third display screen are activated.

7. The foldable display device of claim 1, wherein the processor is further configured to differently adjust illuminance of the first display screen and the second display screen from the illuminance of the third display screen, when the first display screen, the second display screen, and the third display screen are activated.

8. The foldable display device of claim 7, wherein the processor is further configured to adjust the illuminance of the first display screen and the second display screen higher than the illuminance of the third display screen, when the foldable display device is unfolding.

9. The foldable display device of claim 7, wherein the processor is further configured to adjust the illuminance of the first display screen and the Second display screen lower than the illuminance of the third display screen, when the foldable display device is folding.

10. The foldable display device of claim 1, wherein the processor is further configured to adjust illuminance of at least one of the first display screen and the second display screen based on a higher illuminance value among the first illuminance value and the second illuminance value.

11. The foldable display device of claim 1, wherein the first display screen and the second display screen are included in one display unit.

12. The foldable display device of claim 1, wherein the first display screen is included in a first display unit and the second display screen is included in a second display unit.

13. The foldable display device of claim 1, wherein the processor is further configured to adjust illuminance of at least one of the first display screen and the second display screen, which are installed on the first side, based on the detected second illuminance value.

14. The foldable display device of claim 1, wherein the processor is further configured to adjust illuminance of at least one of the first display screen and the second display screen, which are installed on the first side, based on the detected first illuminance value, when the foldable display device is unfolding and the folding angle between the first body and the second body is equal to the prescribed first angle or greater than the prescribed first angle.

15. The foldable display device of claim 1, wherein the processor is further configured to adjust illuminance of at least one of the first display screen and the second display screen, which are installed on the first side, based on the detected first illuminance value, when the foldable display device is folding and the folding angle between the first body and the second body is equal to the prescribed first angle or greater than the prescribed first angle.

16. The foldable display device of claim 1, wherein the processor is further configured to adjust illuminance of at least one of the first display screen and the second display screen, which are installed on the first side, based on the detected second illuminance value, when the foldable display device is folding and the folding angle between the first body and the second body is smaller than the prescribed first angle.

17. A method of controlling a foldable display device, the method comprising:
  sensing, via an angle sensing unit, a folding angle between a first body supporting a first display screen and a third display screen, and a second body supporting a second display screen, wherein the first display screen and the second display screen are installed on a first side of the foldable display device and the third display screen is installed on the second side, which is the opposite side of the first side, and the folding angle is an angle formed by the first body and the second body, when the first display screen and the second display screen are foldable in a direction to which the first display screen and the second display screen are facing;
  detecting, via a first illuminance sensing unit installed on the first side, a first illuminance value, when the folding angle between the first body and the second body is equal to a prescribed first angle or greater than the prescribed first angle;

adjusting illuminance of at least one of the first display screen and the second display screen installed on the first side, based on the detected first illuminance value;

detecting, via a second illuminance sensing unit installed on the second side, a second illuminance value, when the folding angle between the first body and the second body is smaller than the prescribed first angle; and adjusting illuminance of the third display screen installed on the second side, based on the detected second illuminance value.

* * * * *